United States Patent [19]

Ivashin et al.

[11] 4,156,130
[45] May 22, 1979

[54] JOYSTICK MECHANISM

[75] Inventors: Victor S. Ivashin, Pleasant Hill; Neal W. Vinson, Martinez, both of Calif.

[73] Assignee: Tele Industries, Inc., Pleasant Hill, Calif.

[21] Appl. No.: 836,556

[22] Filed: Sep. 26, 1977

[51] Int. Cl.$^2$ ............................................. G06M 3/08
[52] U.S. Cl. ............................... 235/92 MP; 33/1 M; 338/128; 235/92 EA; 235/92 CV; 235/92 R
[58] Field of Search ....... 235/92 MP, 92 CV, 92 EA, 235/92 DN, 92 GC; 33/1 M; 338/128; 74/471 R

[56] References Cited

U.S. PATENT DOCUMENTS

| | | | |
|---|---|---|---|
| 3,182,399 | 5/1965 | Price | 33/1 M |
| 3,365,975 | 1/1968 | Hathaway | 338/128 |
| 3,455,026 | 7/1969 | Brault | 33/1 M |
| 3,561,125 | 2/1971 | Zeidler | 33/1 M |
| 3,567,950 | 3/1971 | Meyer | 33/1 M |
| 3,696,397 | 10/1972 | Raser | 33/1 M |
| 3,729,129 | 4/1973 | Fletcher et al. | 235/93 EA |
| 3,745,966 | 7/1973 | Seager | 338/128 |
| 3,758,949 | 9/1973 | Fausel et al. | 33/1 M |
| 3,832,781 | 9/1974 | Flagge | 33/1 M |
| 3,944,798 | 3/1976 | Eaton | 33/1 M |

Primary Examiner—Joseph M. Thesz
Attorney, Agent, or Firm—Schatzel & Hamrick

[57] ABSTRACT

A joystick mechanism for transducing vector motion of an end of a joystick into its X and Y components including: an X-potentiometer having a body and a shaft, a bracket for mounting the body of the X-potentiometer to a surface, a Y-potentiometer having a body and a shaft, a rod connecting the shaft of the X-potentiometer to the body of the Y-potentiometer so that the shafts of the X and Y-potentiometers lie at right angles to each other, and a joystick having one end attached to the shaft of the Y-potentiometer and which is oriented such that its effective axis lies at a right angle relative thereto.

9 Claims, 10 Drawing Figures

U.S. Patent   May 22, 1979   Sheet 1 of 3   4,156,130
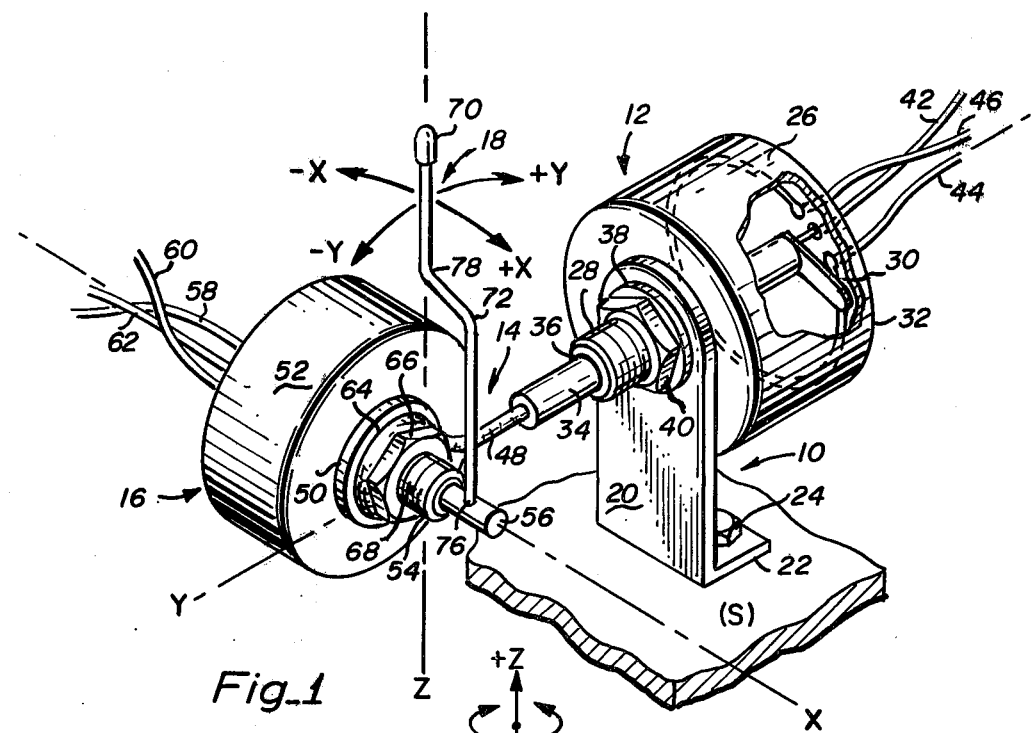
Fig_1
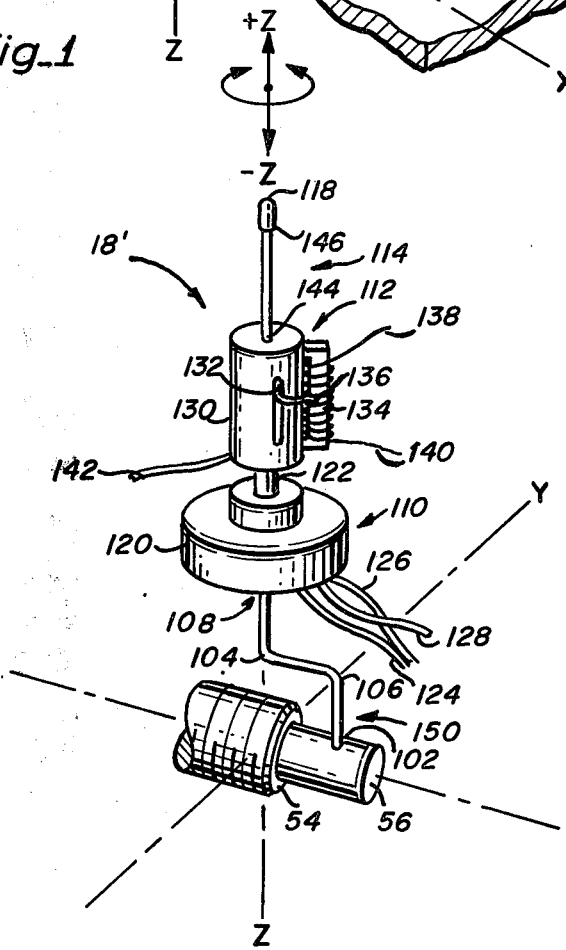
Fig_2

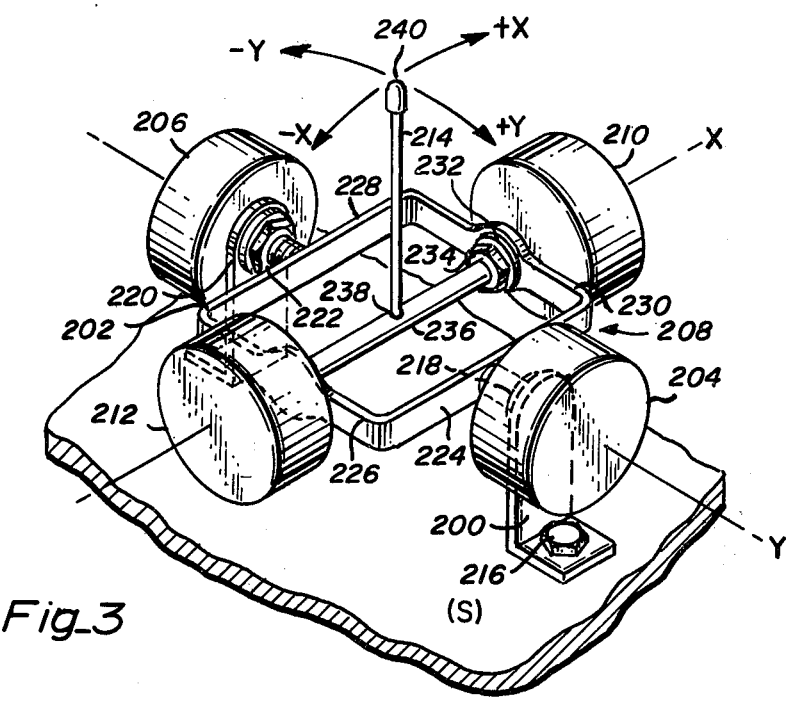
Fig_3
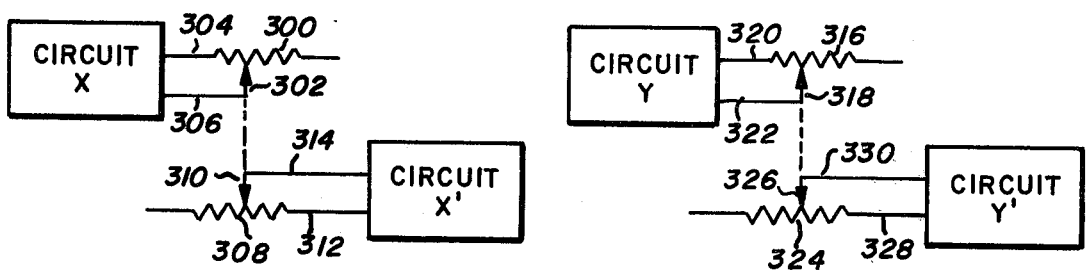
Fig_4a
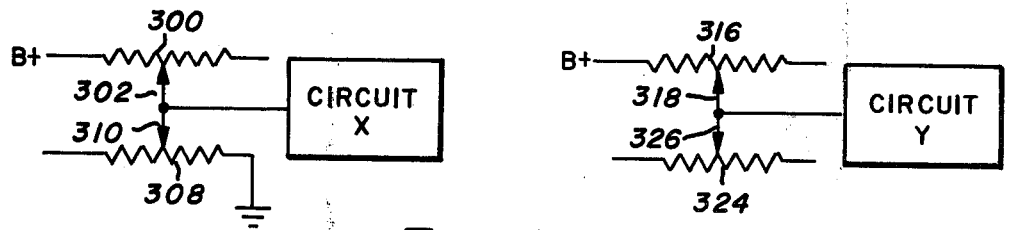
Fig_4b

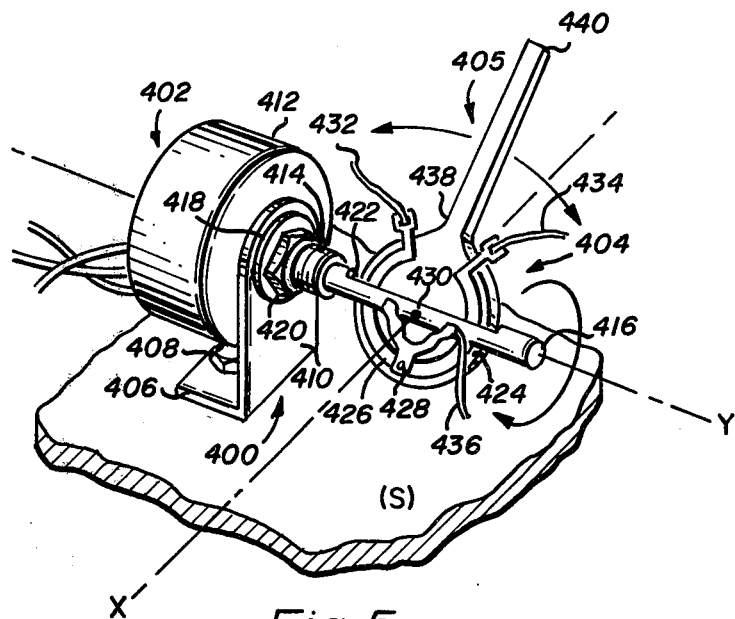
Fig_5
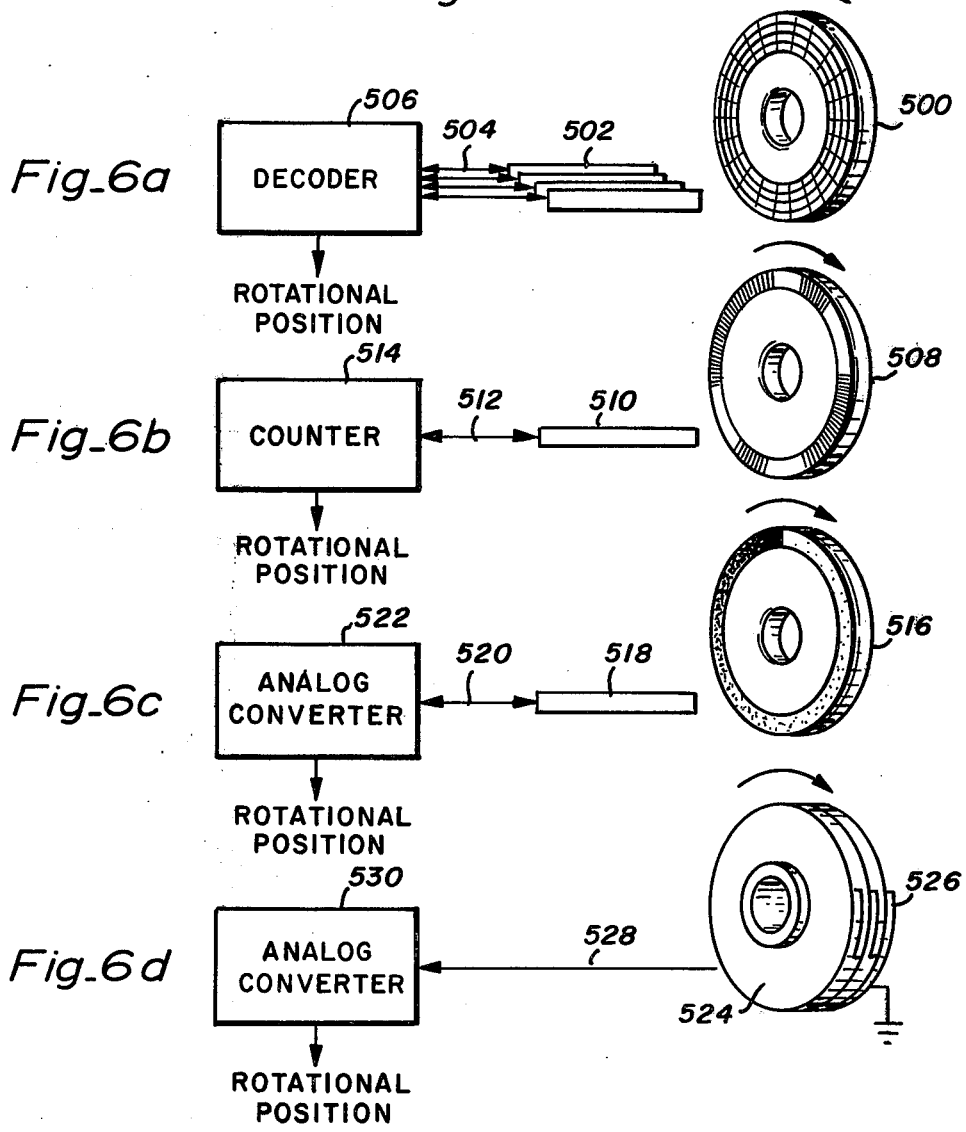
Fig_6a
Fig_6b
Fig_6c
Fig_6d

JOYSTICK MECHANISM

BACKGROUND OF THE INVENTION

1. Field of the Invention

The present invention relates generally to joystick mechanisms designed to convert vector motion of an end of a joystick into corresponding electrical vector component signals and more particularly to joystick mechanisms using transducers connected in a gimbal-like arrangement to translate physical motion of an end of a joystick into vector component signals.

2. Discussion of the Prior Art

Joystick mechanisms find favor in practical applications where it is desirable to control a plurality of transducers with a single control lever, or joystick. For instance, a joystick mechanism may be used in an airplane to control transducers that govern pitch, roll and yaw. Another application is found in the new breed of electronic games where the joystick is used to control transducers that govern the X and Y position of a spot on a screen.

Generally speaking, a joystick mechanism comprises a control lever effectively attached to the center point, or origin, of a gimbal structure having transducers connected to the several axes thereof, such that movement of the unattached end of the joystick causes the transducers to generate signals corresponding to the vector position of the joystick.

Although devices can be made having 360° freedom of motion, in practical applications the joystick is restricted to motion along an arbitrarily small region of an imaginary sphere, which may be approximated by a cartesian plane wherein the X and Y axis of the plane correspond to two of the axes of the gimbal. In this type of arrangement, an X-Y vector movement of the joystick enables an X component to be developed by an X transducer and a Y component to be developed by a Y transducer.

One prior art type of joystick mechanism is exemplified by U.S. Pat. Nos. 2,020,258; 3,365,975; 3,760,320; 3,918,021 and 3,939,451, all of which disclose devices that have several transducers affixed to a housing surface. For example, U.S. Pat. No. 2,929,258 discloses a joystick mechanism in which a collar type of gimbal arrangement is used to interconnect the angularly intersecting shafts of two potentiometers which are controlled by a joystick. Note, however, that both potentiometers are mounted to the supporting housing.

A second type of joystick controller found in the prior art is exemplified by the U.S. Pat. No. 3,350,956 to A. B. Monge which discloses a joystick connected to a gimbal arrangement consisting of a complex framework designed to support a plurality of pivotally connected radial arms having transducers located at some of the pivotal points thereof in order to translate joystick motion into X and Y component signals. Apparently, the entire gimbal arrangement is mounted to a surrounding support frame through one of the transducers.

A disadvantage with such joystick mechanisms is that they require many linkages and other connecting elements to transmit the motion of the joystick to the transducers, thus resulting in undue mechanism complexity and expense.

A second disadvantage common to joystick mechanisms found in the prior art is that they often require unusual or nonstandard transducers for their operation. This adds to the difficulty of manufacture and to the cost of the mechanism.

SUMMARY

It is an object of this invention to provide a joystick mechanism that is simple and clean in design, and includes a minimum of connecting elements.

Another object of this invention is to provide a joystick mechanism that uses standard potentiometers as transducing elements.

A further object of this invention is to provide a joystick mechanism in which no more than one transducer need be mounted on a support surface or housing.

The above objects have been met with a joystick mechanism including an X axis rotational transducer having its body portion attached to a support structure, a Y axis rotational transducer having its body portion connected to the shaft of the X axis transducer so that the Y axis transducer's shaft is at right angles to the X axis transducer shaft, and a joystick having one end attached to the shaft of the Y axis transducer so that motion of the other end of the joystick along an X axis is detected by the X axis transducer, and motion along a Y axis is detected by the Y axis transducer.

An advantage of the present invention is that it includes only one simple connector between the X and Y axis transducers.

Another advantage of the present invention is that no complex framework is needed to support the transducers.

Still another advantage of the present invention is that standard rotary potentiometers may be used as transducers.

These and other objects and advantages of the present invention will no doubt become apparent after reading the following detailed description of the preferred embodiments which are illustrated in the several figures of the drawings.

IN THE DRAWING

FIG. 1 is a perspective view showing a joystick mechanism in accordance with the present invention;

FIG. 2 is a perspective view illustrating an alternate construction for the joystick shown in FIG. 1;

FIG. 3 is a perspective view showing an alternate embodiment of a joystick mechanism in accordance with the present invention;

FIG. 4 is a partial block and schematic diagram illustrating typical applications for the mechanism illustrated in FIG. 3;

FIG. 5 is a perspective view showing another alternate embodiment of a joystick mechanism in accordance with the present invention; and FIGS. 6a through 6d are partial perspective and block diagrams illustrating alternative transducing elements for use in embodiments in accordance with the present invention.

DESCRIPTION OF THE PREFERRED EMBODIMENT

Referring to FIG. 1, a preferred embodiment of the present invention includes a mounting bracket 10, an X axis rotational transducer 12, a connecting rod 14, a Y axis rotational transducer 16, and a control means such as a joystick 18.

Mounting bracket 10, in this embodiment, is an L-shaped member having a leg 20 and a foot 22 where the leg and the foot portions of the bracket are at substantially right angles.

The foot of the L bracket is attached to a surface S. A preferred method of attachment is a sheet metal screw 24 which is passed through a hole in foot 22 and engages within a smaller hole in surface S. Other methods of attachment, such as spot welding or gluing, are also adequate.

An upper end of leg 20 is provided with a relatively large aperture which can pass the bushing of a standard rotary potentiometer.

The X axis rotational transducer is usually, for reasons of economy and for circuit simplicity, a rotary potentiometer including a body 26, a bushing 28, a resistive element 30, a wiper 32 and a shaft 34.

Body 26 is usually cylindrical in shape, and is attached to, or integrally formed with, bushing 28 which is cylindrical, and is provided with external threads. The bushing is also provided with a bore 36 which is coaxial with the cylindrical body and shaft.

The bushing of body 28 is passed through the aperture in the upper end of leg 20 and is retained therein by lock washer 38 and nut 40. Lock washer 38 helps to prevent the body of transducer 12 from rotating, which would miscalibrate the X axis transducer.

Internal to body 26 is resistive element 30 which is usually circumferentially located with respect to the circular cross section of the body. Wiper 32 has two ends, one pivoting around the axis of the cylindrical body, and the other being in sliding contact with the resistive material. Wires 42 and 44 are connected to a first and second end of the resistive material and a wire 46 is connected to the wiper. Thus, by connecting either wire 42 or 44 to a power source and the other one to a ground, a voltage is developed between wire 46 and ground which is a function of the rotational position of wiper 32.

Shaft 34 is placed through bore 36 and extends into body 26 and, since the bore is coaxial with the bushing and body, shaft 34 is also. The end of shaft 34 that is internal to body 26 is attached to wiper 30 so that when shaft 34 is rotated within bore 36 the wiper also rotates. The axis about which shaft 34 rotates is, in this specification, known as the Y axis.

A connecting rod 14 includes a thin rod 48 and a circular ring 50 which, in this preferred embodiment, is formed as a rolled extension of an end of rod 48, and has an inside diameter large enough to pass the bushing of a potentiometer. An imaginary line through the center of rod 48 would intersect with the center of circular ring 50.

Ring 50 could also be manufactured separately from rod 48 and then be attached by soldering, welding, etc. Alternatively, a washer with an internally defined aperture large enough to pass the bushing of a potentiometer may be attached to rod 48 in place of a separately formed ring.

Connecting rod 14 is coaxially attached to shaft 34 by forming a bore in the end of shaft 34 that is slightly larger in diameter than rod 48, inserting the rod into the bore and retaining it therein by soldering, brazing or the like.

Y axis transducer 16, in this preferred embodiment, is also a rotary potentiometer including a body 52, a threaded bushing 54, a shaft 56 and having the ends of a resistive element and a wiper connected to wires 58, 60 and 62, respectively.

Bushing 54 is passed through ring 50 and is retained therein by lock washer 64 and nut 66. Lock washer 62 helps to prevent body 52 from rotating, which would miscalibrate the Y axis transducer.

Shaft 56 extends through a bore in bushing 54 and is attached to a wiper in a manner analogous to the previous discussion of the X axis transducer. The axis of shaft 56, and consequently the axis of body 52 and bushing 54, is known in this specification as the X axis.

The X and Y axes are mutually perpendicular at all times, and intersect at an origin 68 located within bushing 54. Transducer 16 is rotatable about the Y axis at the origin.

Wires 58, 60 and 62 may be used to form a voltage divider in a manner analogous to that previously described, for acurately detecting the rotational position of shaft 56.

Thus, the present invention is a gimbal-like arrangement defining two mutually perpendicular axes, and transducers capable of determining rotation about the axes. It is to be clearly understood that the X axis rotational transducer, which is coaxial with the Y axis, detects X axis vector motion and that the Y axis rotational transducer, which is coaxial with the X axis, detects Y axis vector motion.

Joystick 18 has an upper end 70, elbow bends 72 and 74, and a lower end 76. Upper end 70 and the origin define a Z axis which is always perpendicular to the X axis. The portion of joystick 18 between end 70 and bend 72 is generally coaxial with the Z axis.

Bends 72 and 74 serve to position end 76 proximate to shaft 56 of the Y axis rotational transducer where it is attached to shaft 56 by first drilling a hole through the shaft, inserting it into the hole and retaining it therein by brazing, soldering or the like.

Bends 72 and 74 are necessary because the joystick, which needs to be connected to the Y axis rotational transducer's shaft, must have its free end defining points on a sphere with a centerpoint at origin 68.

The operation and theory of the joystick mechanism of the present invention is explainable as follows.

End 70 of the joystick, if unimpeded by other members of the joystick mechanism or by surrounding obstacles, could rotate around origin 68 with complete freedom. The points attainable by end 70 would define a sphere with a center at the origin.

In practical applications, the joystick is restricted to a relatively small motion, as indicated in FIG. 1 by $\pm X$ and $\pm Y$. This region of the sphere is, in fact, so small that it can be approximated by a cartesian plane having X and Y axes corresponding to the X and Y axes defined by the shafts of the transducers.

Any motion by end 70 along the X axis causes the entire Y axis transducer to rotate, which in turn rotates the shaft of the X axis transducer. Thus, X axis motion at the end of the joystick is detected by the X axis transducer. Any motion by end 70 along the Y axis causes shaft 56 to rotate, thus the Y axis rotational transducer detects motion along the Y axis.

Since end 70 may move about in its cartesian plane with complete freedom and with an X-Y vector motion, the X and Y axis rotational transducers, as explained previously, detect the corresponding X and Y vector components simultaneously.

FIG. 2 illustrates an alternate embodiment for joystick 18, previously described. Joystick 18' includes a lower portion 100 having a lower end 102, elbow bends 104 and 106 and upper end 108; a Z axis rotational transducer 110, a Z axis translational transducer 112 and an upper portion 114 having an upper end 118.

Lower end 102 is attached to shaft 56 of the Y axis rotational transducer in a manner such as was discussed in the previous embodiment. Bends 104 and 106 perform similar functions as bends 72 and 74 in the previous embodiment, that is, to align end 118 of joystick 18' with the Z axis.

Z axis rotational transducer 110, in this embodiment, is preferably a standard rotatable potentiometer having a body 120 and a shaft 122 both coaxial with the Z axis. Body 120 is attached to end 108 by a suitable means, such as brazing. Transducer 110 has wires 124, 126 and 128 attached to the ends of a resistive element and to the potentiometer's wiper respectively. These wires could be connected to a power source such as a voltage divider, and thereby accurately reflect the rotational position of shaft 122 about the Z axis.

Z axis translational transducer 112 is preferably a linear type potentiometer including a cylindrical body 130, an elongated slot 132, a resistive element 134 and a wiper 136. Cylindrical body 130 is coaxial with the Z axis and is attached at a lower end to shaft 122, preferably by brazing.

Resistive element 134 is attached to the exterior of cylinder 130. Connected to one end of the resistive material is a wire 138 and connected to the other end is a wire 140.

Wiper 136 extends outward from the center of cylinder 130 through slot 132 and is in sliding contact with the resistive element, its other end being connected to wire 142.

Wires 138, 140 and 142 could be connected to a power source such as a voltage divider to develop a voltage proportional to the Z axis translational position of the wiper.

The lower end of the upper portion of the joystick, not shown, is attached to wiper 136 and extends out of cylinder 130 through an axial hole 144. End 118 may be provided with a knob 146.

In operation, when a translational force along the Z axis is exerted upon end 118, wiper 136 slides along resistive element 134. Therefore, translational motion by the joystick is detected by translational transducer 112. When a rotational force around the Z axis is exerted upon end 118, transducer 112 rotates as a whole, which in turn rotates shaft 122. Therefore, rotational motion of end 118 about the Z axis is detected by transducer 110.

Vector motion in the X-Y cartesian plane is unimpeded, and therefore the joystick mechanism in this alternate embodiment allows a vector motion in an X-Y-Z space where the vector components are detected by the X and Y rotational transducers and the Z translational transducer, respectively, and the mechanism also detecting rotation about the Z axis.

A first alternate embodiment is illustrated in FIG. 3. This embodiment includes a first mounting bracket 200, a second mounting bracket 202, a first X axis transducer 204, a second X axis transducer 206, gimbal arms 208, a first Y axis transducer 210, a second Y axis transducer 212 and a joystick 214.

Mounting bracket 200 is of the L type previously discussed. The foot of bracket 200 is attached to a surface S' by a sheet metal screw 216. Mounting bracket 202 is also an L shaped bracket having a foot and an upright leg and is attached to surface S' in a similar manner. The upright legs of the brackets are facing and parallel, and their feet preferably extend in opposite directions.

The transducers in this embodiment are again preferably rotational potentiometers having bodies, bushings, shafts, etc., as previously described.

The bushing of potentiometer 204 is disposed in the aperture of bracket 200 and retained therein by a lock washer, not shown, and a nut 218. The bushing of potentiometer 206 is passed through the aperture of bracket 202 and is retained therein by a lock washer 220 and nut 222. Potentiometer 204 and 206 face each other and have their shafts coaxial with a common Y axis.

Gimbal arms 208, in top plan view appears to be a square with rounded corners and has integrally formed arms 224, 226, 228 and 230. Midway to the lengths of each of the arms are apertures wherein the apertures on arms 224 and 228 are slightly larger than a potentiometer's shaft and the apertures on arms 226 and 230 are large enough to pass the bushing of potentiometers.

The shaft of potentiometer 204 is secured in the aperture of arm 224 and the shaft of potentiometer 206 is secured in the aperture of arm 228, both preferably by brazing, welding, or soldering. Thus, gimbal arms 208 may freely rotate about the Y axis.

The bushing of potentiometer 210 is disposed in the aperture in arm 230 and is retained therein by a lock washer 232 and nut 234. The bushing of potentiometer 212 is disposed in the aperture in arm 226 and secured therein by a lock washer and nut, not shown. Potentiometers 210 and 212 face inwardly towards each other, and their shafts, which touch and are brazed together to form a composite shaft 236, are coaxial with the X axis. The X and Y axes are always mutually perpendicular, and define an origin 238 at their point of intersection.

A joystick 214 is attached to composite shaft 236 at origin 238 by forming a bore through the shaft, positioning an end of the joystick therein and securely brazing it in place. The joystick defines a Z axis intersecting with the origin, the axis always being perpendicular to the X axis. A knob 240 may be provided on the free end of joystick 214 for ease of handling.

In operation the free end of joystick 214 is made to move along an X-Y vector. Both X transducers detect the X vector component and both the Y transducers detect the Y vector component.

FIG. 4a and 4b illustrates two applications for the joystick mechanism depicted in FIG. 3.

In FIG. 4a resistive element 300 and wiper 302 of, for instance, potentiometer 204 are connected by wires 304 and 306 to circuit X. Resistive element 308 and wiper 310 of, for example, potentiometer 206 are connected by wires 312 and 314 respectively, to circuit X'. Wipers 302 and 308 are mechanically coupled to gimbal arms 208, as indicated by the dotted lines.

Similarly, a resistive element 316 and wiper 318 of potentiometer 210 are connected by wires 320 and 322, respectively, to circuit Y, resistive element 324 and wiper 326 of potentiometer 212 are connected by wires 328 and 330, respectively, to circuit Y', and wipers 318 and 326 are mechanically coupled by gimbal arms 208 as indicated by the dotted lines.

If the end of the joystick 214 is caused to move with an X vector component, both X axis potentiometers would detect that motion. A circuit X could generate a low power signal for display purpose and circuit X' could generate a high power servo mechanism control signal. Similarly, the two Y axis potentiometers could also control high and low power circuits.

Another application for the circuit illustrated by FIG. 4a is to control inverse operations. Note that as a first X axis potentiometer is increasing in resistance, a second X axis potentiometer is decreasing in resistance. The same goes for the Y axis potentiometers.

In an aircraft, a turn is made by lowering flaps on one side and raising them on the other. Therefore, a circuit X could control the flaps on one wing and a circuit X' could control the flaps on the other. In an analogous manner the Y and Y' circuits could control the inverse operations involved in altitude control.

Referring now to FIG. 4b we see a second application for the joystick mechanism illustrated in FIG. 3. In this application wipers 302 and 310 on the two X axis potentiometers are both electrically and mechanically connected, and the two Y potentiometer wipers 318 and 326 are similarly connected.

An advantage with connecting the potentiometers in this manner is that the wipers may develop a voltage ranging from B+ to ground. Other joystick mechanisms using potentiometers only allow a limited portion of that voltage range to be developed at the wipers.

A second alternative embodiment is illustrated in FIG. 5 and includes L bracket 400, X axis rotational transducers 402, Y axis rotational transducer 404 and joystick 405.

L bracket 400 has a foot 406 attached to a surface S, preferably by a sheet metal screw 408 and a leg 410 which is perpendicular to the foot and is provided with an aperture large enough to pass the bushing of a standard rotary potentiometer.

The X axis rotational transducer, in this embodiment, is a standard type rotary potentiometer having a body 412, a threaded bushing 414, and an elongated shaft 416. Bushing 414 is passed through the aperture in leg 410 and is secured therein by a lock washer 418 and a nut 420.

Elongated shaft 416 is provided with a longitudinal slot 422. The axis that shaft 416 rotates about is defined as a Y axis.

The Y axis rotational transducer, in this embodiment, is a potentiometric element including a disk 424, a resistive element 426 and a wiper 428. Disk 424 is retained in slot 422 by a pivot pin 430 through its center and is free to rotate therein. The pivot pin's axis defines an X axis.

Resistive element 426 is circumferentially aligned with the disk and has terminal points connected to wires 432 and 434.

Wiper 428 is mechanically affixed to the shaft and is in sliding contact with the resistive element. A wire 436 is connected to the wiper.

Joystick 405 has a lower end 438 and an upper end 440. Lower end 438 is attached to the disk by brazing, welding, or any other suitable method. As upper end 440 is caused to move along an X-Y vector, its X component vector is detected by X axis transducer 402 and its Y component vector is detected by Y axis transducer 404.

Z axis transducers may be easily added to joystick 405 of this embodiment in the same way as the previous embodiments.

FIG. 6 illustrates four alternative transducers to be used in the stead of potentiometric elements. All are especially adapted to replace disk 424 of FIG. 5, but may be used to replace any of the potentiometers discussed in the previous embodiments.

FIG. 6a shows a digitally coded disk 500, detector 502, transmission lines 504, and detector 506. Disk 500 has a plurality of positionally unique codes radially situated on its surface. Since, in this embodiment, the code is a four digit pattern, two bits per digit, a total of 256 positionally unique codes are possible, or approximately one code for ever 1.4° around the circumference of the disk.

The positional codes are sensed by detector 502 and are transmitted by lines 504 to decoder 506. The decoder analyzes the optical code input and outputs a rotational position signal.

FIG. 6b illustrates a marked disk 508, detector 510, transmission line 512 and counter 514. Disk 508 has radial positional marks equally situated about a surface of the disk. These positional marks are sensed by a detector 510 and are transmitted by line 512 to counter 514 which counts the number of marks passing the sensor, computes the rotational difference between an initial or "home" position, and outputs a rotational position.

FIG. 6c shows a shaded disk 516, a detector 518, a transmission line 520, and an analog converter 522. The disk has a graduated shaded portion circumferentially situated on a surface. The shaded portion is sensed by detector 518 and is transmitted by line 520 to analog converter 522. The converter computes the intensity of the shaded portion, compares it to a reference, and then outputs a rotational position signal.

It is to be understood that the disks are usually the rotary members and the detectors are usually the stationary members of the transducers. However, alternate embodiments may reverse this arrangement, using the disks as stationary members and the detectors as moving members, with no loss of effectiveness in the mechanism.

The disks discussed in FIG. 6a, b and c are usually optically coded, marked and shaded, respectively. The detectors then may comprise a light source and a photodetector. Alternate embodiments include disks that are magnetically coded, marked or shaded, etc., and detectors responsive to the magnetic disks.

FIG. 6d shows variable capacitor plates 524 and 526, one of which is fixed and the other of which is rotatable.

The interplate capacitance is sensed by analog converter 530 via line 528 which then outputs a rotational position corresponding to the positionally unique capacitance between plates 524 and 526.

Other possible transducers include variable inductances, hydraulic assemblies, pressure transducers, resolvers and gravimetric sensors to name a few. In fact, any signal means be it electrical, mechanical, hydraulic or otherwise in nature, which varies in correspondence to a component of joystick motion may be used.

Joystick mechanisms are usually enclosed by a protective housing. The housing is often a substantially rectangular box with a circular aperture made in one of its sides. The joystick is disposed within the aperture and the rest of the mechanism is mounted inside the housing. The closer the mechanism is mounted to the aperture, the greater the freedom of motion enjoyed by the joystick.

To further protect the joystick mechanism against destructive agents such as dust, dirt, and liquids means are often provided to cover the housing's aperture. One such means is a rubber boot that is attached about the aperture and which has a small hole to pass the joystick through. Another such means is a dust plate having a small hole on its surface to pass a joystick. The dust plate may slide freely about, but is large enough to always cover the housing aperture.

Although several preferred embodiments of the present invention have been discussed, it is contemplated that additional modifications and alterations could be made thereto. For example, one alternate embodiment would have mechanical adjustment means, such as a setscrew, to vary the rotational positions of the transducers for calibration purposes. Another such embodiment would have actuating rather than detecting transducers. The actuating transducers could convert voltage levels to an X-Y vector motion at the end of a joystick.

It is therefore intended that the illustrated embodiments not be taken as limiting, but instead by way of example only, and that the appended claims be interpreted as covering all such alterations and modifications as fall within the true spirit and scope of the invention.

What is claimed is:

1. A joystick mechanism for generating output signals corresponding to the vector position components of an input mechanical displacement, comprising:
    a first transducer having a first member, and a second member which is rotatable in a first direction relative to said first member, said first transducer being operative to develop a first output signal corresponding to the rotational positioning of said first member relative to said second member;
    a second transducer having a third member, and a fourth member which is rotatable in a second direction relative to said third member, said second transducer being operative to develop a second output signal corresponding to the rotational positioning of said third member relative to said fourth member;
    means for mounting said first member to a reference surface;
    means for connecting said third member to said second member such that said first transducer supports said second transducer and such that said first and second directions are along arcuate paths that lie in planes normal to each other;
    control means including an elongated shaft having one end connected to said fourth member and another end movable over an imaginary spherical surface to which orthogonal coordinates can be ascribed relative to a neutral position whereby movement of said another end to any position on said imaginary surface causes corresponding rotation of said second member relative to said first member and of said fourth member relative to said third member such that said first output signal is proportional to one coordinate of said position on said imaginary surface and said second output signal is proportional to another coordinate of said position on said imaginary surface.

2. A joystick mechanism as recited in claim 1 wherein the first and second transducers are potentiometers.

3. A joystick mechanism as recited in claim 1 wherein the second members of said first and second transducers are disks having a plurality of positionally unique codes radially situated thereon, and wherein said first and third members of said first and second transducers include decoder means responsive to said code and operative to detecting said disks' rotational position.

4. A joystick mechanism as recited in claim 1 wherein said second and fourth members of said first and second transducers are disks having a plurality of marks radially situated thereon, and wherein the first members of said first and second transducers include counter means responsive to said marks and operative to detecting said disks' rotational position.

5. A joystick mechanism as recited in claim 1 wherein said second and fourth members of said first and second transducers are disks having graduated shaded portion circumferentially situated thereon, and wherein the first members of said first and second transducers include means responsive to said shading and operative to detecting said disks' rotational position.

6. A joystick mechanism as recited in claim 1 wherein the first and second members of said first transducer are the plates of first variable capacitor, and wherein said third and fourth members of said second transducer are the plates of a second capacitor.

7. A joystick mechanism as recited in claim 1 further comprising:
    a third transducer which connects said one end of said shaft to said fourth member, said third transducer including a fifth member affixed to said fourth member and a sixth member affixed to said one end of said shaft and which is movable in a third direction relative to said fifth member when said shaft is moved along its longitudinal axis, said third direction being normal to said imaginary surface, said third transducer being operative to develop a third output signal corresponding to the positioning of the fifth member relative the sixth member.

8. A joystick mechanism comprising:
    a first potentiometer having a resistor-carrying first body portion and a wiper-carrying shaft portion rotatably mounted to said first body portion;
    a second potentiometer having a resistor-carrying second body portion and a wiper-carrying shaft portion rotatably mounted to said second body portion;
    means for mounting the body portion of said first potentiometer to a reference surface;
    means for connecting the shaft portion of said first potentiometer to the body portion of said second potentiometer;
    a joystick having a first and second end;
    means for attaching a first end of said joystick to the shaft portion of said second potentiometer;
    whereby vector motion of a second end of said joystick is detected as a first vector component by said first potentiometer and as a second vector component by said second potentiometer.

9. A method for making a joystick mechanism from two rotary potentiometers each having a resistor-carrying body portion and a wiper-carrying shaft portion comprising:
    attaching the body portion of a first of the potentiometers to a reference surface;
    connecting the body portion of a second of the potentiometers to the shaft portion of said first potentiometer, the shaft portion of said first potentiometer being disposed at a right angle to the shaft portion of said second potentiometer; and
    attaching one end of an elongated joystick to the shaft portion of said second potentiometer.

* * * * *